UNITED STATES PATENT OFFICE.

RENÉ BOHN, OF MANNHEIM, GERMANY, ASSIGNOR TO BADISCHE ANILIN AND SODA FABRIK, OF LUDWIGSHAFEN-ON-THE-RHINE, GERMANY, A CORPORATION.

BLUE DYE AND PROCESS OF MAKING SAME.

SPECIFICATION forming part of Letters Patent No. 724,789, dated April 7, 1903.

Application filed December 7, 1901. Serial No. 85,096. (Specimens.)

*To all whom it may concern:*

Be it known that I, RENÉ BOHN, doctor of philosophy and a chemist, citizen of the Swiss Republic, residing at Mannheim, in the Grand Duchy of Baden, Germany, have invented new and useful Improvements in Blue Coloring-Matter, Derivatives Thereof, and Processes Relating to the Same, of which the following is a specification.

My invention relates to developments and improvements of the invention patented to me by Letters Patent No. 682,523, September 10, 1901. I have found that the coloring-matter obtained as described in the specification of the said Letters Patent is not always of a homogeneous character, but may consist of or contain bodies which I will refer to as A and B, and these can be separated from one another by suitable means; and the final object of my present invention is the production of the two bodies A and B in a commercially-pure state and either in their reduced or in their unreduced form. I have further found that by suitably choosing the conditions for the treatment of beta-amido-anthraquinone or derivatives thereof with caustic alkali either A or B can be directly obtained as the chief or sole product of the invention. If the melt be conducted, for example, by fusing beta-amido-anthraquinone with from two to five times its weight of caustic potash at a temperature of about 250° centigrade, the coloring-matter obtained consists approximately of two-thirds of A and one-third of B. Further, by performing the fusion in the presence of oxidizing agents—for example, by admitting the air freely in contact with the melt or by adding potassium nitrate thereto—by far the greater part of the reaction product obtained consists of A, while B is formed to but a slight extent. On the other hand, by working at temperatures below 180° centigrade and in the presence of suitable agents—for example, by heating beta-amido-anthraquinone with caustic soda and ethyl alcohol—B can be obtained as the chief product of the reaction. A and B appear to be nearly related to one another in their chemical nature. Possibly they are isomers. In the form of powder they are crystalline and indigo-colored and are practically insoluble in water, in caustic-soda solution, and in mineral acids. A is difficultly soluble in anilin, quinolin, and nitrobenzene, whereas B is easily soluble in these media. B crystallizes from quinolin in blue needles. Both A and B on treatment with suitable alkaline reducing agents—for example, caustic alkali and sodium hydrosulfite—are converted into their reduced forms, that of A being blue and that of B brown-red. The reduced form of A is less soluble than that of B. A and B yield on oxidation yellow-colored products, which can be reduced again to what appear to be the original coloring-matters. In the presence of alkali and reducing agents both A and B dye directly vegetable fiber blue; but the affinity of B for the fiber is apparently less than that of A, and the shades obtained by means of B are less brilliant than those obtained by means of A.

The following examples will serve to further illustrate my invention; but the invention is not confined to these examples. The parts are by weight.

*Example 1—Separation of A and B obtained by fusing beta-amido-anthraquinone with caustic alkali alone at a high temperature.*—Fuse one hundred (100) parts of beta-amido-anthraquinone with from two hundred (200) to five hundred (500) parts of caustic potash for about half (½) an hour at a temperature of about two hundred and fifty (250°) degrees centigrade. Dissolve the melt in water, blow air into the solution formed, and collect the coloring-matter which separates out by filtration. Mix ten (10) parts of the coloring-matter so obtained (and which has been preserved in the form of paste) with one thousand (1,000) parts of water and warm the mixture to a temperature of from sixty (60°) to seventy (70°) degrees centigrade. Add thereto twenty (20) parts of caustic-soda lye (containing about twenty-four per cent. of NaOH) and one hundred and fifty (150) parts of a sodium-hydrosulfite solution (containing about five to six per cent. of the salt) and maintain the temperature at from sixty (60°) to seventy (70°) degrees centigrade for about one (1) hour, or until the coloring-matter is completely dissolved. When this stage is reached, cool the solution and allow to stand for several hours. The sodium salt of the reduced form of A separates out in in the crystalline form. Collect it by filtration. The brown-red mother-liquor contains in its reduced form B, which can be separated therefrom by blowing in air. It is thus obtained in the form of blue-green flocks. Filter them off and wash with water.

*Example 2—Production of a melt from which A is the chief product obtained.*—Heat a mixture of ten (10) parts of beta-amido-anthraquinone, twenty (20) to fifty (50) parts of potassium hydrate, and two (2) parts of potassium nitrate to a temperature of two hundred (200°) degrees centigrade. Raise the temperature gradually to two hundred and fifty (250°) degrees centigrade and maintain this temperature for half ($\frac{1}{2}$) an hour. Pour the melt into water and boil up in the presence of air. The chief product of the reaction is A. Small quantities of B that may be formed can be separated in the manner described in Example 1.

*Example 3—Production of a melt from which B is the chief product obtained.*—Mix ten (10) parts of beta-amido-anthraquinone, fifty (50) parts of potassium hydrate, and twenty-five (25) parts of absolute ethyl alcohol. Heat the mixture for about three (3) hours at from one hundred and forty (140°) degrees to one hundred and fifty (150°) degrees centigrade. Pour the melt into water in the presence of air and filter off the dark-blue precipitate formed. The chief product is B. Small quantities of A that may be formed can be separated as explained in Example 1.

Now what I claim is—

1. The process for the production of blue coloring-matter by fusing beta-amido-anthraquinone with caustic alkali at a high temperature, dissolving the melt in water, blowing air into the solution, collecting the coloring-matter which separates out, reducing the said coloring-matter in an alkaline solution, separating one of the components of the coloring-matter in the reduced form therefrom by crystallization, and leaving the other component in the reduced form in the solution.

2. The process for the separation of the coloring-matters from a mixture containing them by reducing the said mixture in an alkaline solution, separating one of the coloring-matters in its reduced form by crystallization, leaving the other coloring-matter in its reduced form in the mother-liquor, and finally oxidizing both coloring-matters separately.

3. The process for the production of coloring-matter by fusing a mixture of beta-amido-anthraquinone, caustic potash and potassium nitrate, and so producing a melt, dissolving this melt in water, precipitating the coloring-matter by oxidation, separating out any component other than the coloring-matter required which may be present.

4. The process for the manufacture of coloring-matter by melting beta-amido-anthraquinone, caustic potash and a suitable agent together, dissolving the melt in water in the presence of air, and collecting the precipitate formed, separating from it any component other than the coloring-matter required that may be present.

5. As new articles of manufacture the compound coloring-matter the components of which possess the following characteristics: they are crystalline and indigo-colored, and practically insoluble in water, in caustic-soda solution, and mineral acids; one of said components is difficultly soluble in anilin, quinolin, and nitrobenzene whereas the other component is easily soluble in these media, and in the reduced form the former is blue and the latter brown-red, the former being less soluble than the latter, said coloring-matters in their unreduced forms possessing the following characteristics, namely, they are crystalline and indigo-colored, and practically insoluble in water, in caustic-soda solution, and mineral acids; one of said coloring-matters is difficultly soluble in anilin, quinolin, and nitrobenzene, whereas the other is easily soluble in these media.

6. As new articles of manufacture, the compound coloring-matter the components of which in their reduced and unreduced forms respectively possess the following characteristics: they are crystalline and indigo-colored, and practically insoluble in water, in caustic-soda solution and mineral acids; one of said components is difficultly soluble in anilin, quinolin, and nitrobenzene, while the other is easily soluble in these media, and in reduced form one of the components is blue and the other brown-red, the former being less soluble than the latter.

In testimony whereof I have hereunto set my hand in the presence of two subscribing witnesses.

RENÉ BOHN.

Witnesses:
BERNHARD C. HESSE,
JACOB ADRIAN.